W. F. LAING.
SECTIONAL RIM.
APPLICATION FILED MAR. 30, 1920.
1,438,836.
Patented Dec. 12, 1922.
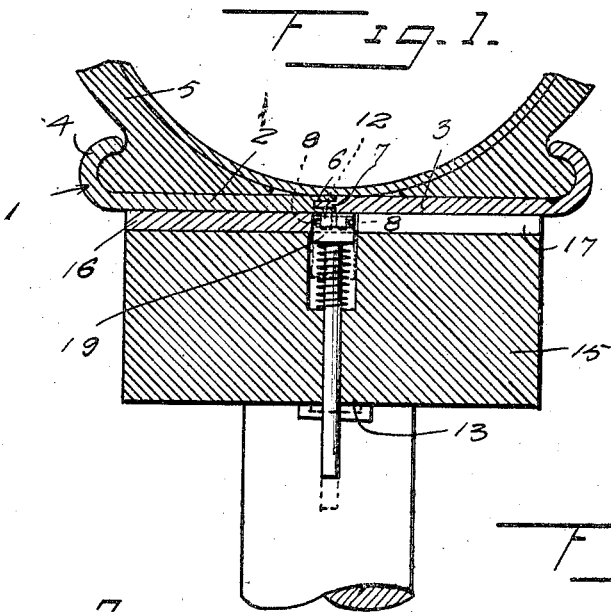
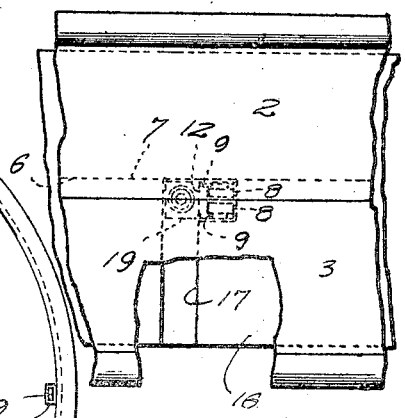
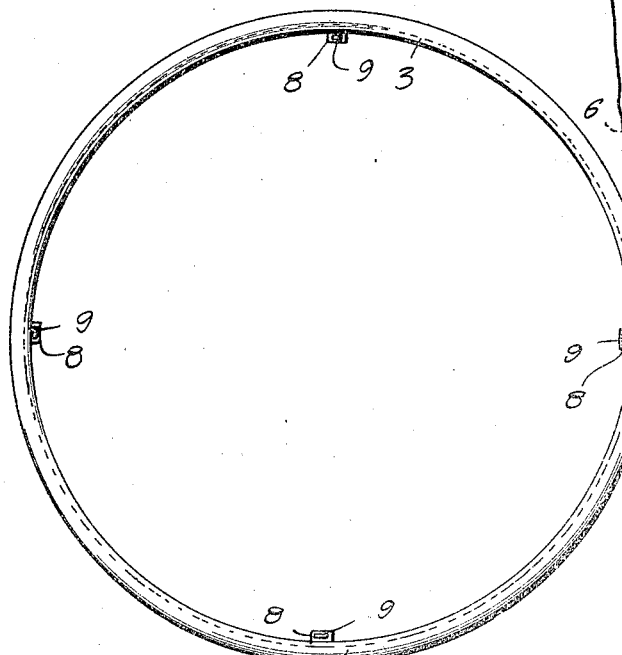
Inventor.
W. F. Laing

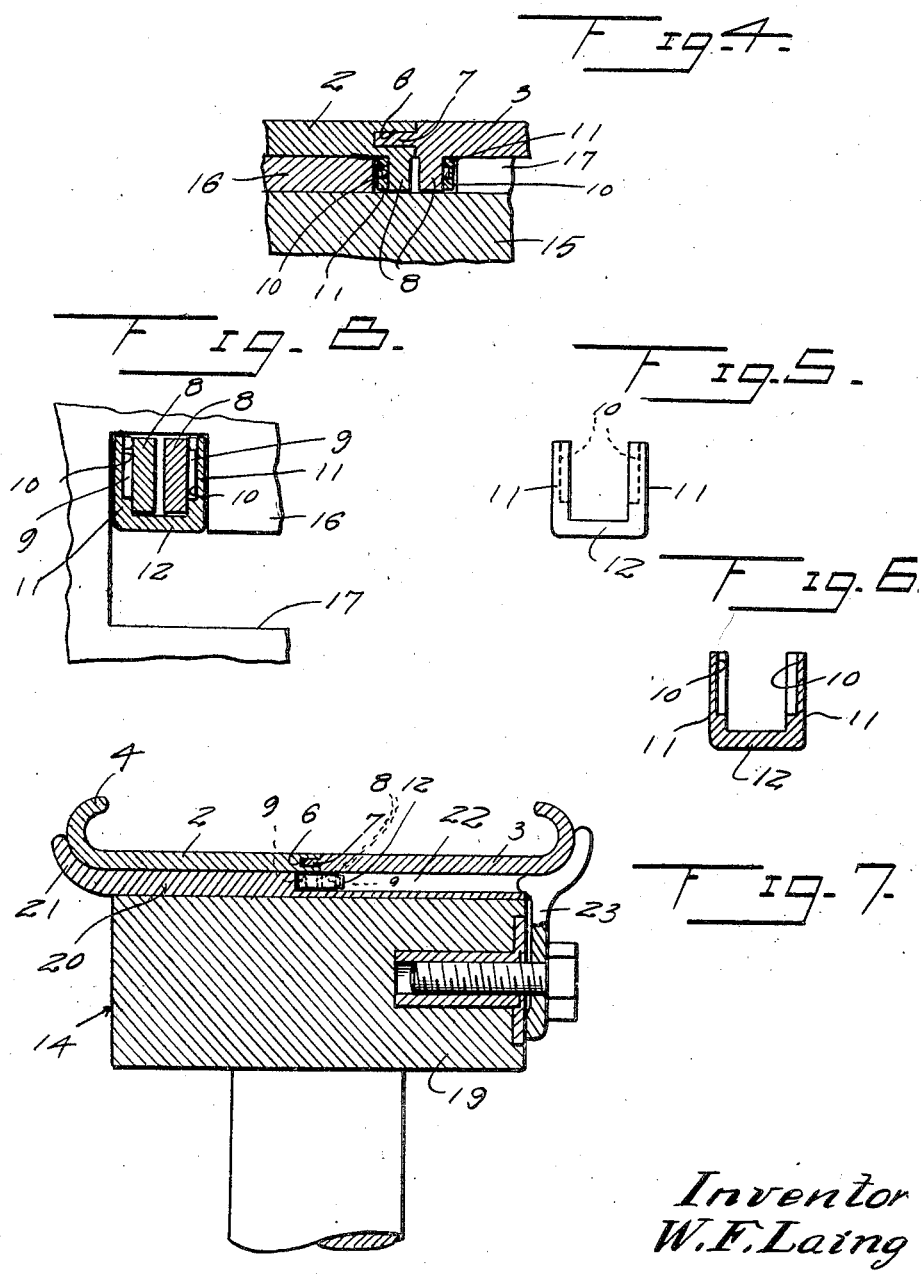

Patented Dec. 12, 1922.

1,438,836

UNITED STATES PATENT OFFICE.

WILLIAM F. LAING, OF KANSAS CITY, MISSOURI.

SECTIONAL RIM.

Application filed March 30, 1920. Serial No. 369,834.

*To all whom it may concern:*

Be it known that I, WILLIAM F. LAING, a citizen of the United States, residing at Kansas City, in the county of Jackson and State of Missouri, have invented certain new and useful Improvements in Sectional Rims; and I do hereby declare the following to be a full, clear, and exact description of the invention, such as will enable others skilled in the art to which it appertains to make and use the same.

This invention relates to new and useful improvements in tire rims and has for its primary object the provision of companion sections detachably connected so that they may be easily separated to permit a quick and easy removal or replacement of a tire on the rim and which will support a tire in an inflated condition when the rim is removed from a wheel.

Another object of this invention is the provision of a tire rim of the character stated which can be used on any ordinary wheel construction or can be employed on a wheel construction of the character set forth in a co-pending application and which will be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawings in which—

Figure 1 is an enlarged transverse sectional view illustrating a sectional rim constructed in accordance with my invention and showing it applied to a wheel forming subject matter of a co-pending application, Figure 2 is a fragmentary plan view of the same, Figure 3 is a side elevation illustrating the rim removed from a wheel, Figure 4 is a detail view illustrating the securing of the lugs of the sections of said rim together, Figure 5 is a plan view, illustrating a locking clip, Figure 6 is a sectional view of said clip showing the grooves therein, Figure 7 is a transverse sectional view, illustrating the rim applied to an ordinary type of wheel, Figure 8 is a fragmentary sectional view illustrating the lugs arranged within the bayonet slot of the felly and with the clip applied thereto.

Referring in detail to the drawings, the numeral 1 indicates as an entirety a sectional rim including sections 2 and 3 that have formed upon their outer edges tire engaging flanges 4 which engage or receive the beads of a tire 5. The section 2 on its inner edge is provided with a groove 6 adapted to receive a reduced annular flange 7 formed on the inner edge of the section 3 whereby when said sections are assembled they abut each other and form an even bearing surface for the tire. The sections 2 and 3 have formed at their inner edges inwardly directed lugs 8 adapted to abut each other when the sections 2 and 3 are assembled. Ribs 9 are formed on the lugs 8 and are received within grooves 10 formed in arms 11 of substantially U-shaped clips 12. The U-shaped clips 12 are adapted to be placed over the lugs 8 with the ribs 9 disposed in the grooves 10 so that the sections 2 and 3 are held against separation when the rim is demounted permitting a tire to be supported on the rim in an inflated condition. To remove or replace a tire on the rim 1, the clips 12 are removed from the lugs 8 permitting the sections 2 and 3 to separate, thus it will be seen that the tire can be easily and conveniently removed or replaced on the rim when the sections are separated.

The rim 1 can be used in connection with a wheel construction 13 which forms the subject matter for a co-pending application, or can be used in conjunction with an ordinary wheel construction 14. The wheel construction 13 includes a felloe 15 having a band 16 provided with spaced bayonet grooves or slots 17 that open outwardly of one edge of said band and the lugs 8 with the clips 12 applied thereto are adapted to be received by the bayonet slots 17 and after being positioned in said slots, spring actuated plungers 19 carried by the felloe 15 close said slots and prevent the lugs and clips from moving outwardly of said slots and also the walls of said slots prevent the clips from accidentally disengaging from the lugs, thus it will be seen that the sections 2 and 3 of the rim are firmly secured together and to the wheel.

The rim 1 is applied to an ordinary wheel construction 14 that includes a felloe 19 provided with a rim or band 20 having formed at one edge a flange 21 and its other edge minus of a flange and said band 20 is provided with transverse grooves 22 that open outwardly of the plain edge of the band 20 to receive the lugs 8 and clips 14. The felloe 19 has removable cleats 23 that cooperate with the flange 21 of the band 20 in preventing the rim 1 from shifting laterally of the felloe 19.

While I have shown and described the preferred embodiment of my invention, it will be understood that minor changes in construction, combination, and arrangement of parts may be made without departing from the spirit and scope of the invention as claimed.

Having thus described my invention, what I claim is:

A tire rim including companion sections provided with pairs of inwardly extending abutting lugs, ribs formed on the outer side faces of the lugs and extending horizontally thereof, U-shaped clips straddling the pairs of lugs and arranged horizontally of the latter and having grooves formed in the opposing faces of the arm portions thereof to receive the ribs, said grooves extending through the free ends of said arm portions to permit the clips to be applied and removed from the lugs, said ribs preventing the clips from moving endwise of the lugs.

In testimony whereof I affix my signature in presence of two witnesses.

WILLIAM F. LAING.

Witnesses:
CLARENCE C. CHILCOTT,
CLARENCE MUSSER.